United States Patent
Hatayama et al.

(10) Patent No.: US 7,824,256 B2
(45) Date of Patent: Nov. 2, 2010

(54) GAME APPARATUS AND STORAGE MEDIUM THAT STORES GAME PROGRAM

(75) Inventors: Yosuke Hatayama, Kyoto (JP); Hiroaki Tamura, Kyoto (JP); Yasutaka Takeuchi, Kyoto (JP)

(73) Assignee: Nintendo Co., Ltd., Kyoto-Shi, Kyoto (JP)

( * ) Notice: Subject to any disclaimer, the term of this patent is extended or adjusted under 35 U.S.C. 154(b) by 1527 days.

(21) Appl. No.: 10/902,015

(22) Filed: Jul. 30, 2004

(65) Prior Publication Data
US 2005/0026675 A1  Feb. 3, 2005

(30) Foreign Application Priority Data
Jul. 31, 2003 (JP) .............................. 2003-283770

(51) Int. Cl.
*G06F 17/00* (2006.01)
(52) U.S. Cl. ....................................................... 463/17
(58) Field of Classification Search .................. 463/10, 463/17, 37, 43, 27, 4
See application file for complete search history.

(56) References Cited

U.S. PATENT DOCUMENTS

| 94,852 | A | * | 9/1869 | Fujioka et al. | ............... | 452/141 |
| 5,229,756 | A | * | 7/1993 | Kosugi et al. | ............... | 345/156 |
| 6,267,677 | B1 | * | 7/2001 | Tajiri et al. | .................... | 463/43 |
| 7,011,582 | B1 | * | 3/2006 | Yamamoto | ................... | 463/31 |
| 2001/0005689 | A1 | * | 6/2001 | Fujioka et al. | ................. | 463/4 |
| 2001/0031653 | A1 | * | 10/2001 | Oe et al. | ........................ | 463/1 |
| 2008/0215981 | A1 | * | 9/2008 | York et al. | .................. | 715/720 |

FOREIGN PATENT DOCUMENTS

| JP | 07-155470 | 6/1995 |
| JP | 2002-248265 | 9/2002 |
| JP | 2002248265 A | * 9/2002 |

OTHER PUBLICATIONS

Feb. 11, 1999, IGN:Mario Party Review, <http://ign64.ign.com/articles/160/160397p1.html>.*
ID Software, Doom, Copyright 1993, 1-13.*

* cited by examiner

*Primary Examiner*—Dmitry Suhol
*Assistant Examiner*—Malina K Rustemeyer
(74) *Attorney, Agent, or Firm*—Nixon & Vanderhye P.C.

(57) ABSTRACT

A game apparatus includes a CPU, and a selection screen including a plurality of kinds of items for allowing a player to select is displayed. The selection screen is a roulette type of display, for example, so that a display proportion of each item may be set based on an ability value of a character, a proceeding situation of a game or a support voltage of a virtual audience that reflects a play content, for example, and as the item, kinds of games, a rule, an event, etc. This roulette is rotated and suspended in response to an operation of the player. Furthermore, one item is determined when the roulette is suspended, and a game process is executed according to the item.

15 Claims, 12 Drawing Sheets

| PROCEEDING SITUATION OF GAME (SUPPORT VOLTAGE) | DISPLAY PROPORTION | ROULETTE |
|---|---|---|
| LEADING BY EQUAL TO OR MORE THAN 5 SCORES (MAXIMUM ON OPPONENT SIDE) | 1 : 2 : 1 |  |
| BEING LED BY EQUAL TO OR MORE THAN 5 SCORES (MAXIMUM ON PLAYER SIDE) | 2 : 1 : 1 |  |

FIG. 4

| COMPETING OPPONENT | ABILITY VALUE | | | DISPLAY PROPORTION (SOCCER : VOLLEYBALL : BASEBALL) |
|---|---|---|---|---|
| | SOCCER | VOLLEYBALL | BASEBALL | |
| TEAM (CHARACTER) 1 | 3 | 3 | 3 | 1 : 1 : 1 |
| TEAM (CHARACTER) 2 | 5 | 1 | 3 | 5 : 1 : 3 |
| TEAM (CHARACTER) 3 | 1 | 7 | 1 | 1 : 7 : 1 |

| COMPETING OPPONENT | ABILITY VALUE OF BASEBALL | | | DISPLAY PROPORTION (STEAL BASE PROHIBITED : HOME RUN COMPETITION : 12-INNINGS BATTLE) |
|---|---|---|---|---|
| | RUNNING POWER | BATTING POWER | PITCHING POWER | |
| TEAM (CHARACTER) 1 | 5 | 4 | 3 | 5 : 4 : 3 |

FIG. 9

| PROCEEDING SITUATION OF GAME (SUPPORT VOLTAGE) | DISPLAY PROPORTION | ROULETTE |
|---|---|---|
| LEADING BY EQUAL TO OR MORE THAN 5 SCORES (MAXIMUM ON OPPONENT SIDE) | 1 : 2 : 1 | RAIN / PLAYER'S TEAM POWER UP / OPPONENT TEAM POWER UP |
| BEING LED BY EQUAL TO OR MORE THAN 5 SCORES (MAXIMUM ON PLAYER SIDE) | 2 : 1 : 1 | RAIN / PLAYER'S TEAM POWER UP / OPPONENT TEAM POWER UP |

FIG. 12

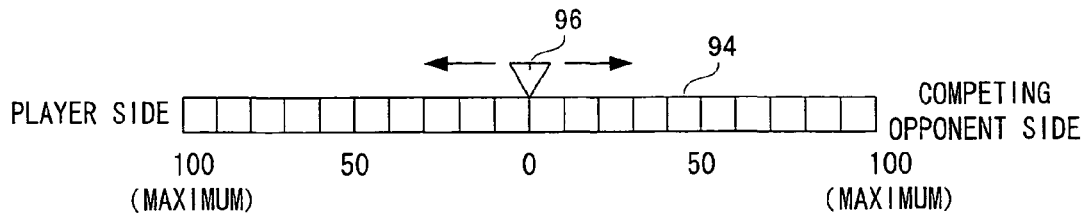

FIG. 13

| CHANGE CONDITION | CHANGED VALUE |
|---|---|
| · PLAYER'S TEAM HITS HOME RUN<br>· PLAYER'S TEAM PERFORMS GREAT PLAY<br>· RETIRE OPPONENT'S OFFENSE IN THREE BATTERS<br>· OPPONENT'S TEAM MAKES ERROR<br>... | +10 ON PLAYER SIDE |
| · OPPONENT TEAM HITS HOME RUN<br>· OPPONENT TEAM PERFORMS GREAT PLAY<br>· OFFENSE OF PLAYER'S TEAM IS RETIRED IN THREE BATTERS<br>· PLAYER'S TEAM MAKES ERROR<br>... | +10 ON OPPONENT SIDE |

GAME APPARATUS AND STORAGE MEDIUM THAT STORES GAME PROGRAM

This application claims priority to JP Application No. 2003-283770, filed 31 Jul. 2003. The entire contents of this application is incorporated herein by reference.

FIELD OF THE INVENTION

The present invention relates to a game apparatus and a storage medium that stores a game program. More specifically, the present invention relates to a game apparatus and a storage medium that stores a game program that executes a game in which a plurality of characters at least including a player character appear, selects one item out of a plurality of kinds of the items, and plays the game.

BACKGROUND AND SUMMARY OF THE INVENTION

One example of such a kind of a game apparatus is disclosed in Japanese Patent Laying-open No. 7-155470. This game apparatus (referred to as a prior art 1) is a game apparatus in which a probability of continuing a game is determined based on a play time period, and a lottery is selected based on the determined probability at a time of ending a game play. Stored in this game apparatus are three kinds of lottery programs, that is, an amida-kuji (Japanese lottery to determine who pays how much, for example) having a winning probability of 1/10, a card-turning-up type lottery having a winning probability of 1/20, and a roulette having a winning probability of 1/40, for example, the lottery program corresponding to the determined probability based on the play time period is selected and executed, and an instruction to continue the game is delivered in a case of winning.

In addition, disclosed in Japanese Patent Laying-open No. 2002-248265 is an electronic roulette game. In this game apparatus (referred to as a prior art 2), the winning probability is changed by modifying the number of balls that move spots on a game board during the progress of the game.

In the prior art 1, the probability of a game-continuing lottery is merely changed, and in the prior art 2, too, the winning probability is merely changed. In neither prior art does a change of the winning probability affect progress and a content of the game later. Therefore, the game is tended to become simple, which leads to a problem that the game lacks an interesting aspect.

SUMMARY OF THE INVENTION

Therefore, it is a primary feature of the illustrative embodiments to provide a novel game apparatus and storage medium that stores a game program.

It is another feature of the illustrative embodiments to provide a game apparatus and a storage medium that stores a game program in which a probability of selecting each item on a selection screen is changed, allowing a game content to be affected later, thus making possible an increase of an interesting aspect of the game.

A game apparatus according to the illustrative embodiments is a game apparatus that executes a game in which a plurality of characters at least including a player character appear. This game apparatus comprises an ability-value storing means, a selection screen displaying means, an operating means, an item determining means, and a processing means. The ability-value storing means stores an ability value of the character. The selection screen displaying means displays a selection screen which includes a plurality of kinds of items for allowing a player to select, and to which a display proportion of each item is set based on the ability value. The operating means is operated by a player. The item determining means determines one item out of the plurality of kinds of items displayed on the selection screen in response to an operation of the operating means. The processing means performs a game process based on the item determined by the item determining means.

More specifically, the game apparatus (10: reference numeral corresponding in a preferable embodiment described later. Hereinafter, the same is true.) is a game apparatus that executes a game in which a plurality of characters at least including a player character appear. In the ability-value storing means (54), an ability value (82) of the character is stored. The selection screen displaying means (42, 64, S17) displays a selection screen which includes a plurality of kinds of items for allowing a player to select, and on this selection screen, a display proportion of each item is set based on the ability value. The display proportion of each item on the selection screen may be stored as data (82), etc., set in advance based on the ability value, or may be set by calculating based on the ability value, for example. In addition, the selection screen may be stored in advance as image data (84), etc., corresponding to each character or each display proportion, or may be generated based on the set display proportion, for example. On the selection screen, a probability of being selected is shown by a size of the display proportions of each item. The player looks at this selection screen, and operates the operating means (34) so as to perform an item selection. The item determining means (42, 70, S25) determines one item out of the plurality of kinds of items displayed on the selection screen in response to an operation of the operating means (34). Furthermore, the processing means (42, 72, S29, S35, S39) performs a game process based on the item determined by the item determining means.

Therefore, according to this game apparatus, the display proportion of each item displayed on the selection screen is set based on the ability value of the character so that it is possible to change the probability of each item to be selected corresponding to the ability value of the character. In addition, the game process based on the selected item is executed so that it is possible to affect a selected game proceeding and a content. Therefore, it is possible to make the game full of changes, thus making possible an increase of the interesting aspect of the game.

In a certain illustrative embodiment, the character includes an opponent character that fights against the player character, and the selection screen displaying means displays the selection screen to which the display proportion of each item is set based on the ability value of the opponent character in such a manner as to be rendered advantageous to the opponent character.

More specifically, displayed is the selection screen to which the display proportion of each item is set based on the ability value of the opponent character that fights against the player character in such a manner as to be rendered advantageous to the opponent character. That is, the player is to select the item from the selection screen disadvantageous to himself. Therefore, it is possible to increase a level of difficulty of the game, and in addition, to give the player a sense of satisfaction achieved when the player is capable of selecting the item disadvantageous to the opponent character, thus further increasing the interesting aspect of the game.

In another illustrative embodiment, the item is a kind of fighting sports games correlated with the ability value, or a rule of the game. More specifically, as the item displayed on the selection screen, it is possible to select the kind of fighting sports games or the rule of the game. That is, by the item determining means, one kind of game is determined out of a plurality of the fighting sports games, or one rule is determined out of a plurality of the games. Furthermore, by the processing means, the game process for the one kind of the fighting sports game is executed, or the game process according to the one rule is executed. Therefore, it is possible to apply a change to the kind of game or rule of the game based on the ability value of the character, thus making it possible to increase the interesting aspect of the game.

A game apparatus according to the illustrative embodiments is a game apparatus that executes a game in which a plurality of characters at least including a player character appear. This game apparatus comprises a game proceeding situation determining means, a selection screen displaying means, an operating means, an item determining means, and a processing means. The game proceeding situation determining means determines a proceeding situation of the game. The selection screen displaying means displays a selection screen which includes a plurality of kinds of items for allowing a player to select, and to which a display proportion of each item is set based on a determination result of the game proceeding situation determining means. The operating means is operated by a player. The item determining means determines one item out of the plurality of kinds of items displayed on the selection screen in response to an operation of the operating means. The processing means performs a game process based on the item determined by the item determining means.

More specifically, the game apparatus (10) is a game apparatus for executing a game in which a plurality of characters at least including a player character appear, and the game proceeding situation determining means (42, 74, S53, S57) determines a proceeding situation of the game. The selection screen displaying means (42, 64, S61) displays a selection screen which includes a plurality of kinds of items for allowing a player to select, and on this selection screen, a display proportion of each item is set based on a determination result of the game proceeding situation determining means. The display proportion of each item on the selection screen may, similar to the case of the above-described game apparatus, be stored as data (82), etc., set in advance based on the proceeding situation of the game or a proceeding condition of the game, or may be calculated and set based on the proceeding situation of the game, for example. In addition, the selection screen may be stored in advance as image data (84), etc., that correspond to each game proceeding situation or each display proportion, for example, or generated based on the set display proportion. On such the selection screen, the probability of being selected is shown by a size of a display area of each item. The player looks at this selection screen and operates the operating means (34) so as to select the item. The item determining means (42, 70, S69) determines one item out of the plurality of kinds of items displayed on the selection screen in response to an operation of the operating means (34). In addition, the processing means (42, 72, S71) performs a game process based on the item determined by the item determining means.

Therefore, the display proportion of each item displayed on the selection screen is set based on the proceeding situation of the game so that it is possible to change the probability of each item to be selected according to a condition of the proceeding of the game. In addition, the game process based on the selected item is executed so that it is possible to affect the selected game proceeding or content. Therefore, it is possible to make the game full of changes, and thus, possible to increase the interesting aspect of the game.

A game apparatus according to the illustrative embodiments is a game apparatus that executes a game in which a plurality of characters at least including a player character appear. This game apparatus comprises a support voltage changing means, a selection screen displaying means, an operating means, an item determining means, and a processing means. The support voltage changing means changes a support voltage of a virtual audience in response to a play content of the game. The selection screen displaying means displays a selection screen which includes a plurality of kinds of items for allowing a player to select, and to which a display proportion of each item is set based on the support voltage. The operating means is operated by a player. The item determining means determines one item out of the plurality of kinds of items displayed on the selection screen in response to an operation of the operating means. The processing means performs a game process based on the item determined by the item determining means.

More specifically, the game apparatus (10) is a game apparatus that executes a game in which a plurality of characters at least including a player character appear, and the support voltage changing means (42, 76, S103, S105) changes a support voltage of a virtual audience in response to a play content of the game. Herein, the support voltage is a voltage indicating a level of excitement or a level of enthusiasm of the virtual audience, and an index which the play content of the game affects. This support voltage is changed in such a manner as to be increased or decreased through a magnificent play shown by the player character, or in a case that the player character and another character (competing opponent character, etc.,) fight, causing an event that renders one of the two characters advantageous, for example. The selection screen displaying means (42, 64, S115) displays a selection screen which includes a plurality of kinds of items for allowing a player to select, and on the selection screen, a display proportion of each item is set based on the support voltage having the play content affected. The display proportion of each item on the selection screen may, similar to the case of the above-described game apparatus, be stored as data (82), etc., set in advance based on the support voltage, or set by calculating based on the support voltage, for example. Furthermore, the selection screen may be stored in advance as image data (84), etc., that correspond to each support voltage or each display proportion, or generated based on the set display proportion, for example. On such the selection screen, the probability of being selected is shown by a size of the display area of each item. The player looks at this selection screen and operates the operating means (34) so as to select the item. The item determining means (42, 70, S123) determines one item out of the plurality of kinds of items displayed on the selection screen in response to an operation of the operating means (34) by the player. In addition, the processing means (42, 72, S125) performs a game process based on the item determined by the item determining means.

Therefore, the display proportion of each item displayed on the selection screen is set based on the support voltage that changes corresponding to the play content of the game so that it is possible to change the probability of each item to be selected depending on the play content of the game. Furthermore, the game process based on the selected item is executed so that it is possible to affect the selected game proceeding and the content. Therefore, it is possible to make the game full of changes, thus making possible an increase of the interesting aspect of the game.

In a certain illustrative embodiment, the item is an event of the game. More specifically, it is possible to select the event of the game as an item displayed on the selection screen. That is, one event is determined out of a plurality of game events by the item determining means. In addition, the game process based on the event is executed by the operating means. Therefore, based on the game proceeding situation or the play content, it is possible to give a change to the occurring event, thus making possible an increase of the interesting aspect of the game In another illustrative embodiment, the selection screen is a roulette, and the item determining means includes a rotation processing means for applying a rotation process to the roulette and a suspension processing means for applying a suspension process to the roulette rotated by the rotation processing means in response to an operation of the operating means, and determines one instructed item out of the plurality of kinds of items displayed on the roulette when the roulette is suspended by the suspension processing means.

More specifically, the roulette is elected as the selection screen. The item determining means includes a rotation processing means, and a suspension processing means. The rotation processing means (66, S19, S63, S117) applies a rotation process to the roulette, and a suspension processing means (68, S21-S23, S65-S67, S119-S121) applies a suspension process to the roulette rotated by the rotation processing means in response to an operation of the operating means. In addition, the item determining means determines one instructed item out of the plurality of kinds of items displayed on the roulette when the roulette is suspended by the suspension processing means. Therefore, a result of the roulette affects the later game proceeding and content so that it is possible to increase the interesting aspect of the game that uses the roulette.

A storage medium that stores a game program according to the illustrative embodiments is a storage medium that stores a game program for selecting one item out of a plurality of kinds of items so as to play a game in a game apparatus provided with an operating means operated by a player and executing the game in which a plurality of characters at least including a player character appear. The game apparatus further comprises an ability-value storing means for storing an ability value of the character. This game program allows a processor of the game apparatus to execute a selection screen displaying step, an item determining step, and a processing step. The selection screen displaying step displays a selection screen which includes a plurality of kinds of items for allowing a player to select, and to which a display proportion of each item is set based on the ability value. The item determining step determines one item out of the plurality of kinds of items displayed on the selection screen in response to an operation of the operating means. The processing step performs a game process based on the item determined by the item determining step.

In the storage medium that stores this game program, similar to the above-described game apparatus, it is possible to change the probability of each item to be selected on the selection screen by the ability value of the character, and affect the game proceeding and the content so that it is possible to increase the interesting aspect of the game.

A storage medium that stores a game program according to the illustrative embodiments is a storage medium that stores a game program for selecting one item out of a plurality of kinds of items so as to play a game in a game apparatus provided with an operating means operated by a player and executing the game in which a plurality of characters at least including a player character appear. This game program allows a processor of the game apparatus to execute a game proceeding situation determining step, a selection screen displaying step, an item determining step, and a processing step. The game proceeding situation determining step determines a proceeding situation of the game. The selection screen displaying step displays a selection screen which includes a plurality of kinds of items for allowing a player to select, and to which a display proportion of each item is set based on a determination result of the game proceeding situation determining step. The item determining step determines one item out of the plurality of kinds of items displayed on the selection screen in response to an operation of the operating means. The processing step performs a game process based on the item determined by the item determining step.

In this storage medium that stores the game program, similar to the above-described game apparatus, it is possible to affect the game proceeding and the content by changing the probability of each item to be selected on the selection screen by the proceeding condition of the game, thus making possible an increase of the interesting aspect of the game.

A storage medium that stores a game program according to the illustrative embodiments is a storage medium that stores a game program for selecting one item out of a plurality of kinds of items so as to play a game in a game apparatus provided with an operating means operated by a player and executing the game in which a plurality of characters at least including a player character appear. This game program allows a processor of the game apparatus to execute a support voltage changing step, a selection screen displaying step, an item determining step, and a processing step. The support voltage changing step changes a support voltage of a virtual audience in response to a play content of the game. The selection screen displaying step displays a selection screen which includes a plurality of kinds of items for allowing a player to select, and to which a display proportion of each item is set based on the support voltage. The item determining step determines one item out of the plurality of kinds of items displayed on the selection screen in response to an operation of the operating means. The processing step performs a game process based on the item determined by the item determining step.

In this storage medium that stores the game program, similar to the above-described game apparatus, it is possible to change the probability of each item to be selected on the selection screen by the play content of the game, thus making possible an increase of the interesting aspect of the game.

In a certain illustrative embodiment, the selection screen is a roulette. The item determining step includes a rotation processing step for applying a rotation process to the roulette and a suspension processing step for applying a suspension process to the roulette rotated by the rotation processing step in response to an operation of the operating means, and determines one instructed item out of the plurality of kinds of items displayed on the roulette at a time that the roulette is suspended by the suspension processing step. Therefore, similar to the above-described game apparatus, it is possible to increase the interesting aspect of the game that uses the roulette.

According to the illustrative embodiments, it is possible to change the probability of each item to be selected, by changing the display proportion of each item displayed on the selection screen based on the ability value of the character, the game proceeding situation, the play content of the game, thus it is possible to affect the later game proceeding and content. Therefore, it is possible to increase the interesting aspect of the game.

The above described features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing one example of an ability value table in FIG. 3;

FIG. 9 is a flowchart showing another example of the roulette table;

FIG. 12 is an illustrative view showing one example of a support voltage displayed on a screen;

FIG. 13 is an illustrative view showing one example of a change condition of a support voltage and a changed value that corresponds thereto.

DETAILED DESCRIPTION OF THE PREFERRED EMBODIMENTS

Figure 1:
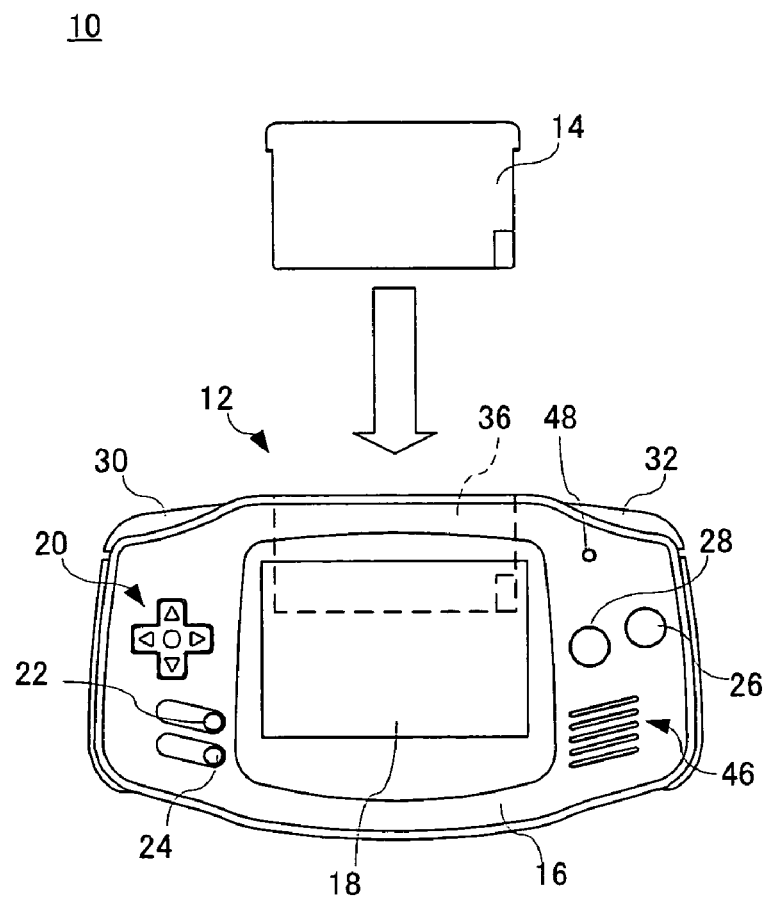
FIG. 1 is an outline view showing one example of a game apparatus of one embodiment of the present invention.

A game apparatus 10 of this embodiment shown in FIG. 1 includes a game machine 12 and a cartridge 14 connected to the game machine 12. A handheld game machine, such as GameBoy Advance (GAMEBOY ADVANCE: product name) for example, may be applicable as the game machine 12.

It is noted that the game apparatus 10 is not limited to the handheld game machine 12, and a video game machine to be used by being connected to a home-use television receiver or a PC (personal computer) may be applicable, for example. In addition, a game information storage medium is not limited to the cartridge 14. Various kinds of information storing media such as an optical information storage medium such as a CD-ROM, a DVD, a magnetooptical disk, or a magnetic disk, may be applicable, for example.

The game machine 12 includes a housing 16, and provided at an approximately center portion of a front surface of the housing 16, is a color liquid crystal display (LCD) 18 as a display. On this LCD 18, a game image including a game world, a game character, etc., are displayed.

In a front surface (front side) of the housing 16, provided in a predetermined position at the left of the LCD 18, are a cross button 20, a start button 22, and a select button 24, and in addition, provided in a predetermined position at the right of the LCD 18, are an A button 26 and a B button 28. Furthermore, provided on either edge portion on the both sides of an upper surface (ceiling surface) of the housing 16, are an L button 30 and an R button 32. Each of these buttons is operating means for a user to operate a game, and collectively shown as an operation portion 34 in FIG. 2.

The cross button 20 functions as a direction switch, and by operating one of four depressing portions, it becomes possible to move a player character (player object), a cursor, etc., displayed on the LCD 18 in vertical and horizontal directions. The start button 22 is used for instructing the starting of the game, and so forth, and the select button 24 is used for selecting a game mode, and so forth. Primarily, the A button 26 is used for determining an item designated by the cursor, and so forth, and the B button 28 is used for canceling the selected item, and so forth. In addition, as a result of being operated one by one or in combination of the other buttons, the A button 26, the B button 28, the L button 30, and the R button 32 are capable of allowing the player object displayed on the LCD 18 to perform certain actions, which are previously determined by each operation, such as throw, catch, jump, cut with a sword, start talking, and so forth, for example. In addition, it is the operation of the A button 26 that instructs suspending a roulette.

A slot 36 is provided on a far side of the upper surface of the housing 16, and the cartridge 14 is inserted into this slot 36 to be detachably mounted. Inside the slot 36 and in an inserting direction edge portion aperture of the cartridge 14, a connector 38 and a connector 40 (FIG. 2), capable of being connected to each other, are provided. Therefore, when the connector 38 and the connector 40 are connected, the cartridge 14 is rendered accessible by a CPU 42 (FIG. 2) of the game machine 12. Furthermore, on a near side of the upper surface of the housing 16, an external expansion connector (communication-use connector) 44 (FIG. 2) is provided. To this connector 44, a communication cable (not shown), etc., are connected at a time of performing an interactive play of a multiplayer-use game, for example.

Below the A button 26 and the B button 28 on the front surface of the housing 16, a speaker 46 is provided, and a game voice or a game sound such as a BGM, sound effect, etc., during the game are output. In addition, above the A button 26 and the B button 28, a power lamp 48, of which lamp is lit as a result of its switch being turned on, and color changes according to a battery remaining amount, is provided. Furthermore, although not illustrated, a battery containing box to which a battery is set is provided at a back of a case, and on a bottom surface of the case, a power switch, a sound volume adjusting knob, a headphone connecting terminal, etc., are provided.

Figure 2:
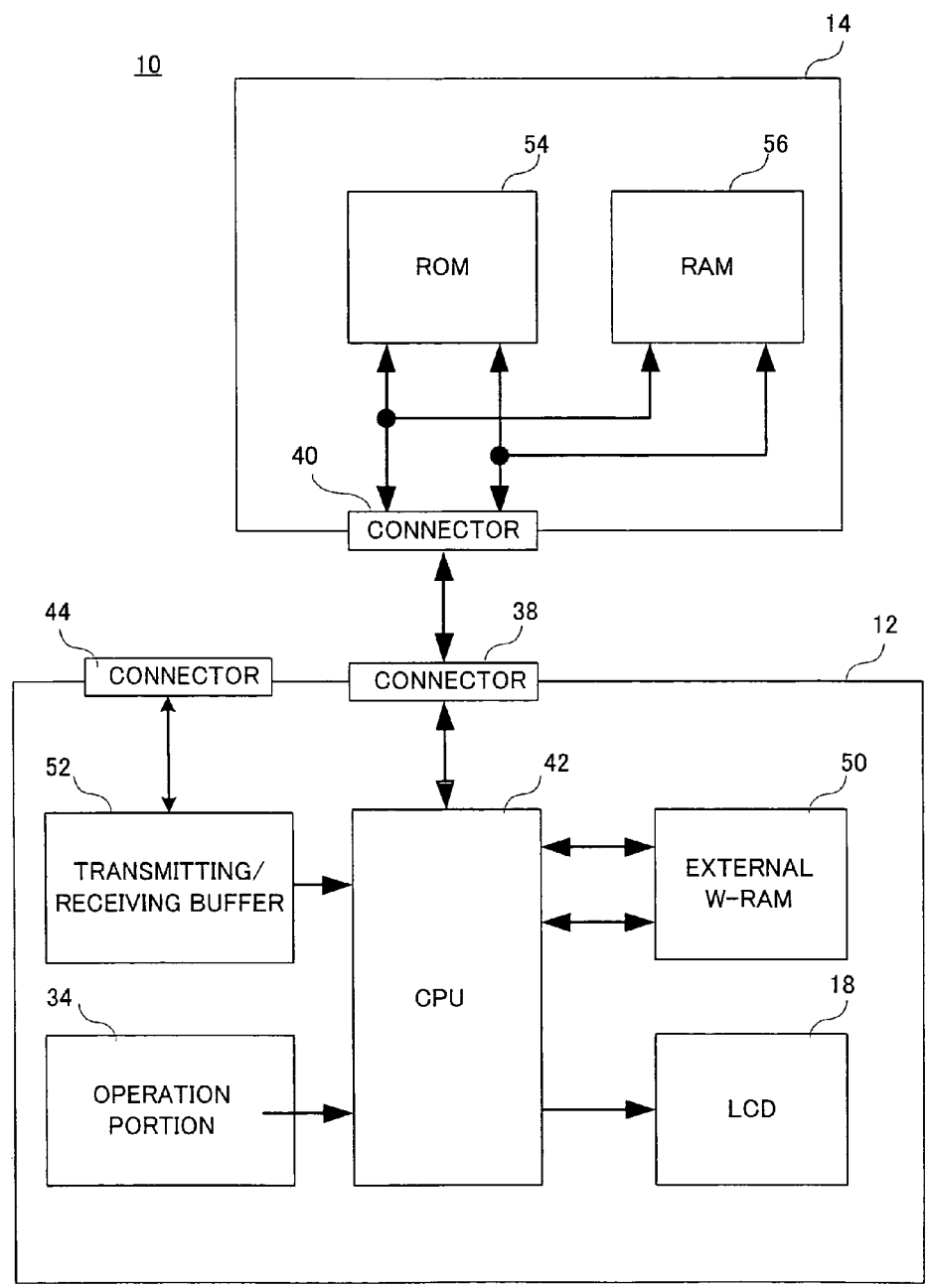
FIG. 2 is a block diagram showing one example of internal structure of the game apparatus of a FIG. 1 embodiment.

In FIG. 2, electric structure of this game apparatus 10 (game machine 12 and the cartridge 14) is illustrated. Referring to this FIG. 2, the game machine 12 includes the CPU 42, and this CPU 42 is also referred to as a processor or a computer, etc. This CPU 42 is responsible for controlling the whole game machine 12. To the CPU 42, the above-described LCD 18, the operation portion 34, and the connector 38 are connected via an internal bus, and an external W-RAM 50, a transmitting/receiving buffer 52, etc., are also connected.

A display signal is applied from the CPU 42 to the LCD 18 so as to display a game image. It is noted that although not illustrated, a VRAM, an LCD controller, etc., are connected to the CPU 42, for example, and under instruction of the CPU 42, background image data, character image data, and game image data are rendered in the VRAM. In addition, the LCD controller reads out the game image data (displayed data) rendered in the VRAM according to an instruction of the CPU 42, and displays a game screen (display screen), etc., on the LCD 18.

The operation portion 34 includes each of the above-described operating buttons 20, 22, 24, 26, 28, 30, and 32 and is capable of applying an operation input signal corresponding to an operation of each of these operating buttons to the CPU 42. Therefore, the CPU 42 executes a process according to an instruction of a player (user), which is applied through the operation portion 34.

The external W-RAM 50 is a writable/readable memory, and used as a work area or a buffer area of the CPU 42. The transmitting/receiving buffer 52 is a buffer for temporarily storing transmitting/receiving data in a case of performing the interactive play of a multiplayer game, for example, and connected to the external expansion connector 44. As a result of the connector 44 being connected to another game machine 12 using a communication cable not shown, it becomes possible to perform a data transmission among a plurality of the game machines 12.

In addition, although not illustrated, the speaker 46 is connected to the CPU 42 via a sound circuit, and sound data is applied from the CPU 42 to be output from the speaker 46.

In the cartridge 14, a ROM 54 and a RAM 56 are contained. The ROM 54 and the RAM 56 are connected to each other via the bus, and connected to the connector 40. Therefore, as described above, when the cartridge 14 is attached to the game machine 12, and as a result, the connector 40 and the connector 38 are connected, which allows the CPU 42 to be electrically connected to the ROM 54 and the RAM 56. In the ROM 54, as described later, a game program and data are stored in a predetermined manner, and the CPU 42 generates temporal data in the W-RAM 50 according to the game program, and executes a process. The RAM 56 is a memory for saving the backup data.

It is noted that although a flash memory, which is a non-volatile memory, is applicable to the RAM 56, a ferroelectric memory (FeRAM), an EEPROM, or an SRAM and a DRAM, etc., that use the battery as a power may be used as another non-volatile memory.

Figure 3:
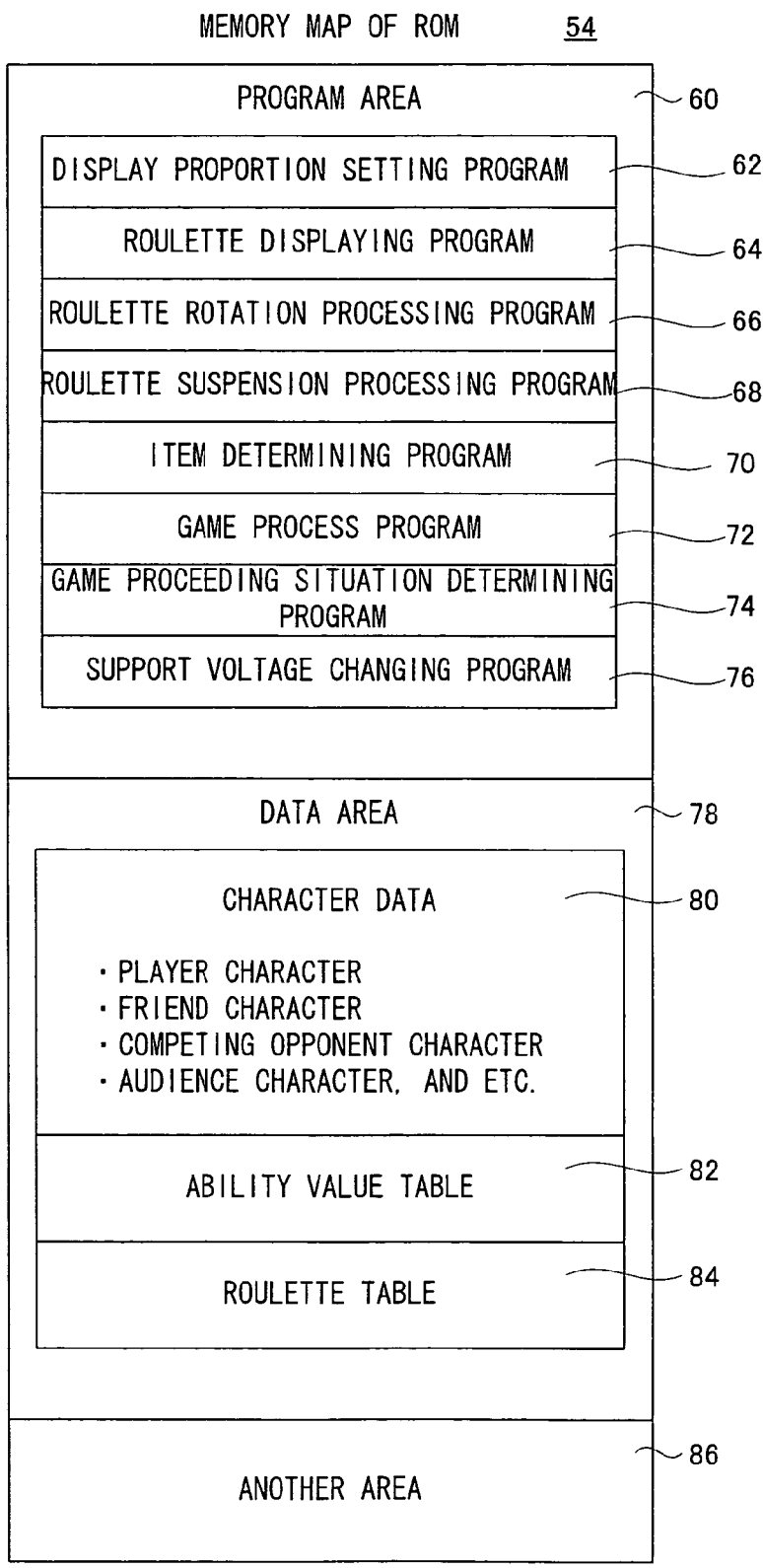
FIG. 3 is an illustrative view showing one example of a memory map of a ROM of a cartridge in FIG. 2.

In FIG. 3, one example of a memory map of the ROM 54 of the cartridge 14 is illustrated. In the ROM 54, formed is a program storing area 60 in which a game program is stored in a predetermined manner. The game program includes a display proportion setting program 62, a roulette displaying program 64, a roulette rotation processing program 66, a roulette suspension processing program 68, an item determining program 70, a game process program 72, a game proceeding situation determining program 74, a support voltage changing program 76, etc., for example.

The display proportion setting program 62 is a program for setting the display proportion of each item on the selection screen for allowing the player to select one item out of a plurality of kinds of items. On the selection screen, the plurality of items for allowing the player to select are shown in such a manner as to have the display area(s) based on the respective display proportions. In addition, the probability of each item to be selected is made to correspond to each display proportion.

As one example of such the selection screen, the roulette is applicable. In this illustrative embodiment, the display proportion that corresponds to an ability value, a game proceeding situation, or the support voltage, etc., are registered in advance on an ability value table 82, or a roulette table 84 described later, and the display proportion is read out by this program 62, and set. It is noted that in a case that the display proportion is not registered in advance on the ability value table 82 or the roulette table 84, etc., the display proportion may be calculated based on the ability value, etc., as required.

The roulette displaying program 64 is a program for displaying the roulette as one example of the selection screen. In this embodiment, a plurality of roulette images are stored in advance so that the roulette image that corresponds to the set display proportion is read out, and displayed on the LCD 18. On this roulette screen, the plurality of kinds of items are shown in such a manner as to have an area in size based on each display proportion.

The roulette rotation processing program 66 is a program for rotating the roulette, and the roulette suspension processing program 68 is a program for suspending the rotating roulette in response to an operation input by the player. The item determining program 70 is a program for determining one instructed item out of the plurality of kinds of items displayed on the roulette when the roulette is suspended. The game process program 72 is a program for performing a game process based on the item determined on the selection screen.

The game proceeding situation determining program 74 is a program for determining a proceeding situation of the game, and determines whether or not the proceeding situation is rendered a predetermined situation. The support voltage changing program 76 is a program for changing a support voltage of a virtual audience (audience character) in the game. The support voltage is a voltage onto which the play content reflects, as described later, and changed in a case that a predetermined condition is achieved in the game, for example.

In addition, in the ROM 54, formed is a data storing area 78. In this data storing area 78, character data 80, the ability value table 82, the roulette table 84, etc., are stored.

The character data 80 is data regarding a plurality of various kinds of characters that appear in the game such as the player character, a friend character, a competing opponent character, the audience character, and etc., for example. The player character is a character (object) operable by the player. On the other hand, the friend character, the competing opponent character, and the audience character are non-player characters not operated by the player. In this embodiment, assumed is a competition-type sports game such as soccer, volleyball, baseball, etc., and the friend character is a member of a team of the player character. The competing opponent character is an opponent's team and a member thereof, and the audience character is a character that represents those people who watch a battle between the player character and the opponent character.

On the ability value table 82, the ability value by each character, and the display proportion of each item on the selection screen are corresponded to each other, and stored. In FIG. 4, one example of the ability table is shown. In this embodiment, the player is made to select one competing opponent out of a plurality of competing opponent characters (competing opponent team), and determine which kinds of sports to fight against the opponent, out of soccer, volleyball, and baseball, for example, by using the selection screen. In this FIG. 4, regarding each of a plurality of the competing opponent teams 1, 2, and 3, the ability values correlated with soccer, volleyball, and baseball, and the display proportions of each item on the selection screen are stored. In this case, the ability value of the competing opponent character is not the ability value by each member, but a general ability value as a whole team. In addition, each item on the selection screen indicates the kinds of competition games such as soccer, volleyball, baseball, etc., as an option. The display proportion of each item is set based on the ability value as described later.

Figure 5:
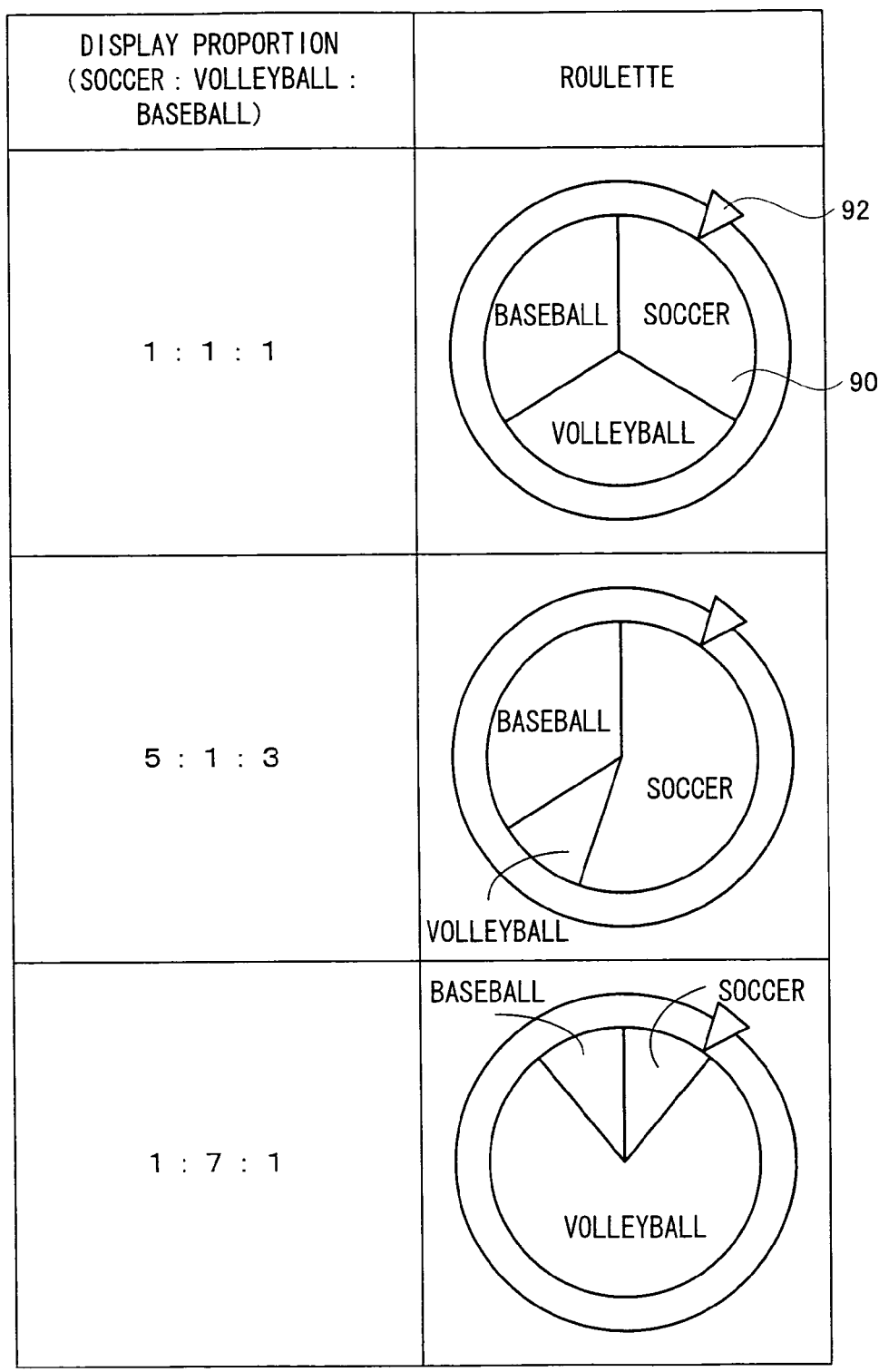
FIG. 5 is an illustrative view showing one example of a roulette table in FIG. 3.

On the roulette table 84, the display proportion of each item and the image data of the roulette (selection screen) having each area based on the display proportion are corresponded to each other, and stored, for example. In FIG. 5, one example of the roulette table is shown. The roulette table 84 in this FIG. 5 is a table that corresponds to the table in FIG. 4, and the roulette is for determining the kind of competition sports games. A roulette screen includes a disk area 90 having a display area divided into each item, and one indicator 92 arranged on a peripheral border of the disk area 90. The disk area 90 is divided into the display areas by each plurality of items by a dividing line extending in a radius manner from the center thereof. On this screen, the disk area 90 is rotated, or the indicator 92 is moved along a circumference of the disk area 90. The item that corresponds to the display area indicated by the indicator 92 when suspended later is determined as a selected item.

In the examples of FIG. 4 and FIG. 5, the display proportion of each item is set in such a manner as to become large in proportion to a size of the ability value of the game that corresponds to the item. In team 2, for example, each of the ability values of soccer, volleyball, and baseball is 5, 1, and 3, and the display proportion of soccer, volleyball, and baseball on the selection screen is set to 5:1:3. That is, a setting is made in such a manner that the higher the ability value, the larger the display area to have, the lower the ability value, the smaller the display area. Therefore, as well understood from FIG. 5, the higher the ability value, the more probable it is selected, thus becoming more advantageous to the competing opponent team. In doing so, it is possible to raise a level of difficulty of the game, and give the player a sense of satisfaction achieved when the player is capable of selecting the item that makes the competing opponent disadvantageous, thus making possible an increase of the interesting aspect as a game.

In addition, as shown in FIG. 3, another area 86, etc., are formed in the ROM 54, and in this area 86, sound data such as a BGM, a sound effect, or a sound, etc., or various kinds of other necessary data are stored, for example.

Figure 6:
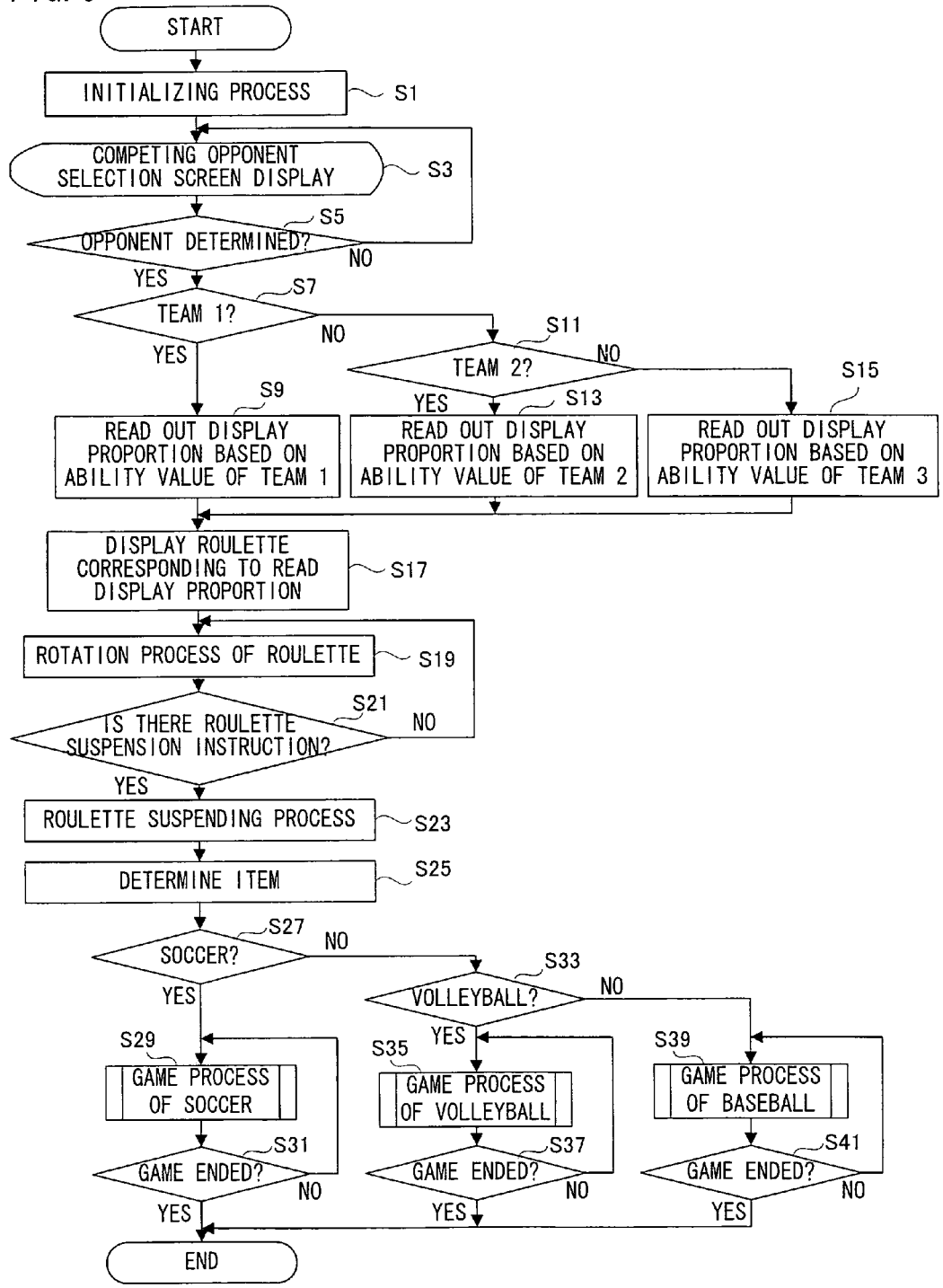
FIG. 6 is a flowchart showing one example of a game operation in the game apparatus of the FIG. 1 embodiment.

Below, described will be a game operation of this game apparatus 10 based on a flowchart shown in FIG. 6. When the player attaches the cartridge 14 into the game machine 12 so as to input a power, the CPU 42 of the game machine 12 starts the game process based on the program stored in the ROM 54 of the cartridge 14. In a first step S1 in FIG. 6, the CPU 42 executes an initializing process such as performing an initial clear of the external W-RAM 50, and in a case that backup data is stored in the RAM 56 of the cartridge 14, reading out the data into the external W-RAM 50, and so forth, for example.

Next, in a step S3, the CPU 42 allows a competing opponent selection screen to be displayed on the LCD 18. On this competing opponent selection screen, a plurality of competing opponent candidates (teams 1, 2 and 3 in this embodiment) are displayed. The player operates the operation portion 34, and moves a cursor, etc., for example, so as to select the competing opponent out of a plurality of candidates. Subsequently, in a step S5, the CPU 42 determines whether or not the competing opponent is determined, that is, determines whether or not an operation input signal from the operation portion 34 is a signal issued by operating the A button 26 in condition that the cursor be pointed to the competing opponent candidate, for example. If "NO" in this step S5, the process returns to the step S3.

On the other hand, if "YES" in the step S5, the CPU 42 determines whether or not the team 1 is selected in a succeeding step S7. If "YES" in the step S7, the CPU 42 reads out the display proportion of each item that corresponds to the team 1 from the ability value table 82 into a predetermined area of the W-RAM 50 in a succeeding step S9. Upon completion of this step S9, the process advances to a step S17.

In addition, if "NO" in the step S7, the CPU 42 determines whether or not the teams 2 is selected in a succeeding step S11. If "YES" in the step S11, the CPU 42 reads out the display proportion of each item that corresponds to the team 2 from the ability value table 82 into a predetermined area of the W-RAM 50 in a succeeding step S13, and the process advances to the step S17.

On the other hand, if "NO" in the step S11, that is, in a case that the team 3 is selected, the CPU 42 reads out the display proportion of each item that corresponds to the team 3 from the ability value table 82 into a predetermined area of the W-RAM 50 in a succeeding step S15, and the process advances to the step S17.

In the step S17, the CPU 42 reads out from the roulette table 84 the image data of the roulette that corresponds to the read display proportion, and allows the roulette, that is, the selection screen (see FIG. 5), to be displayed on the LCD 18. This roulette determines the kind of the game fought between the player and the competing opponent character in this embodiment. In the roulette, as described above, the display proportion of each item is set in such a manner as to be advantageous to the competing opponent character, for example, based on the ability value in each competition game of the competing opponent character.

Subsequently, the CPU 42 executes a rotation process of the roulette in a step S19. Thereby, the disk area 90 of the roulette is rotated, or the indicator 92 is moved along the circumference of the disk area 90. Furthermore, the CPU 42 determines whether or not there is a roulette suspension instruction in a step S21, and if "NO", the process returns to the step S19 so as to allow the roulette to continue rotating. On the other hand, if "YES" in the step S21, that is, in a case that the operation input signal from the operation portion 34 is a signal issued by operating the A button 26, and other cases, for example, the CPU 42 executes a suspension process of the roulette in response to the operation input in a succeeding step S23. Thereby, the rotation of the disk area 90 and the moving of the indicator 92 are gradually suspended.

In addition, in a step S25, the CPU 42 calculates or detects the display area indicated by the indicator 92 when the roulette is suspended, and determines the item that corresponds to the display area as the selected item.

Thereafter, the game process based on the item determined by the roulette is executed. More specifically, the CPU 42 determines whether or not the determined item is soccer in a step S27, and if "YES", the CPU 42 executes the game process of soccer in a succeeding step S29. This game process of soccer is repeatedly executed until it is determined that the game is ended in a succeeding step S31.

On the other hand, if "NO" in the step S27, the CPU 42 determines whether or not the determined item is volleyball in a step S33, and if "YES", the CPU 42 executes the game process of volleyball in a succeeding step S35. This game process, too, is repeatedly executed until it is determined that the game is ended in a succeeding step S37.

On the other hand, if "NO" in the step S33, that is, in a case that the determined item is baseball, the CPU 42 executes the game process of baseball in a succeeding step S39. This game process, too, is repeatedly executed until it is determined that the game is ended in a succeeding step S41.

According to this embodiment, based on the ability value of the competing opponent character, the display proportion of each item (kinds of competition games) displayed in the roulette is set so that it is possible to change the probability of each item to be selected by the ability value of the competing opponent character. In addition, the game process based on the selected item is executed so that it is possible to affect the selected game proceeding and the content. Therefore, it is possible to make the game full of changes, thus making possible an increase of the interesting aspect of the game. More specifically, the display proportion of the item having a high ability value of the competing opponent character is rendered high, and the display proportion is set in such a manner as to be advantageous to the competing opponent character so that it is possible to raise a level of difficult of the game, and give the player a sense of achievement when the item that renders the competing opponent character disadvantageous is selected. Furthermore, it is possible to increase the interesting aspect of the game. In addition, on the selection screen, the probability of each item to be selected is shown depending on a size of the display area of each item so that it is possible to easily comprehend the probability visually, and increase an interesting aspect when selecting the item.

It is noted that in the above-described embodiment, the kinds of competition games such as soccer, volleyball, baseball, etc., are determined on the selection screen. However, the item selected on the selection screen is changed as required, and the rule of the game, etc., may be selected on the selection screen, for example.

Figures 7, 8:
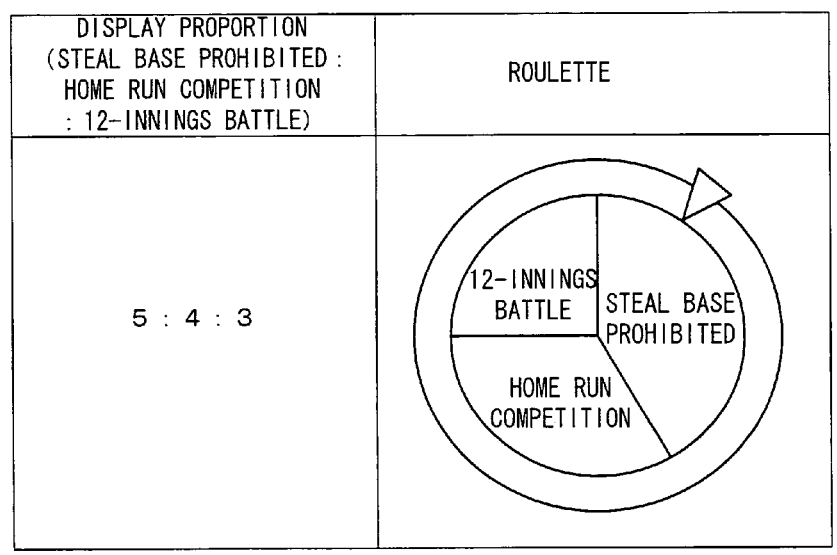
FIG. 7 is an illustrative view showing another example of the ability value table.
FIG. 8 is an illustrative view showing one example of the roulette table that corresponds to the ability value table in FIG. 7.

Another example of the ability value table 82 is shown in FIG. 7, and one example of the roulette table 84 that corresponds to FIG. 7 is shown in FIG. 8, for example. On this ability value table 82, regarding a plurality of competing opponent characters, each ability value in the baseball game, and the display proportions by each rule of the games that correspond thereto are stored, for example. In addition, on the roulette table 84, the display proportion by each rule of the games, and the roulette image data that corresponds thereto are stored. In the examples of FIG. 7 and FIG. 8, as an ability value element in the baseball game, set are a running power, a batting power, and a pitching power. In addition, as the rule of the game, in correlation with each ability value, set are a prohibition of stealing a base that corresponds to the running power, a home run competition that corresponds to the batting power, a 12-innings battle that corresponds to the pitching power. In this example too, the higher the ability value, the higher the display proportion to be set, and the rule that corresponds to the component (running power) having the high ability value is set to the rule (prohibition of stealing the base) not capable of taking advantage of its merits, and the rule that corresponds to the component (pitching power) having a small ability value is set to the rule (12-innings battle) capable of taking advantage of its merits. That is, in this example, the display proportion of each item is set in such a manner as to be disadvantageous to the competing opponent character.

In addition, in each of the above-described embodiments, based on the ability value of the competing opponent character, the display proportion of each item on the selection screen is set. However, the display proportion of each item may be set based on the ability value of the player character. Furthermore, as described above, the display proportion may be set in such a manner as to be advantageous to the competing opponent character, and on the contrary, the display proportion of the item that corresponds to a higher component of the ability value of the player character may be larger in such a manner as to be advantageous to the player character.

Furthermore, in each of the above-described embodiments, the display proportion of each item on the selection screen is stored in advance on the ability value table 82, and read out. However, the display proportion may be set by calculating based on the ability value data of the character. In this case, the roulette image may be generated based on the set display proportion.

In addition, in each of the above-described embodiments, the kinds of games and the rule of the game are determined on the selection screen so that the selection screen is to be displayed when starting the game. However, as another embodiment described next, it may be possible that the selection screen is displayed during the game corresponding to the proceeding situation of the game, and a development thereafter is determined on the selection screen. In addition, the display proportion of each item on the selection screen may be set based on the proceeding situation of the game.

In this case of another embodiment, the roulette table 84 as shown in FIG. 9, for example, is stored in the data storing area 78 of the ROM 54. On the roulette table 84 in FIG. 9, the display proportion of each item on the selection screen and the roulette image are stored in such a manner as to correspond to the proceeding situation of the game. That is, in this embodiment, the proceeding situation is determined during the game, and when it is determined that a predetermined proceeding situation is established, the roulette that corresponds to the situation is displayed. On the roulette, the display proportion of each item is set based on a determination result of the proceeding situation of the game.

More specifically, as the proceeding situation of the game, set are two situations, that is, a situation in which a player's team leads the game by equal to or more than 5 scores, and a situation in which the player's team is led by equal to or more than 5 scores, for example. As a plurality of items displayed on the roulette, set are three items, that is, the events in the game are set, such as "player's team power up", "opponent team power up", and "rain", for example. Herein, "player's team power up" is the event for raising the ability value of the player's team or the member thereof, and "opponent team power up" is the event for raising the ability value of the opponent team or the member thereof. In addition, the "rain" is the event for decreasing the ability value of both of the player's and the opponent teams, or the member thereof, and raising an error occurring rate.

The display proportions of each item, "player's team power up", "opponent team power up", and "rain" are set by considering the proceeding situation of the game. That is, in a case of leading the game by equal to or more than 5 scores, each display proportion is set 1:2:1, for example, and "opponent team power up" is rendered the largest, allowing to be advantageous to the opponent team. On the other hand, in a case of being led by equal to or more than 5 scores, each display proportion is set 2:1:1, for example, and the "player's team power up" is rendered the largest, allowing to be advantageous to the player's team. That is, in this embodiment, as a result of the display proportion being set in such a manner as to be disadvantageous to a predominant side, the battle is rendered even more exciting.

Figure 10:
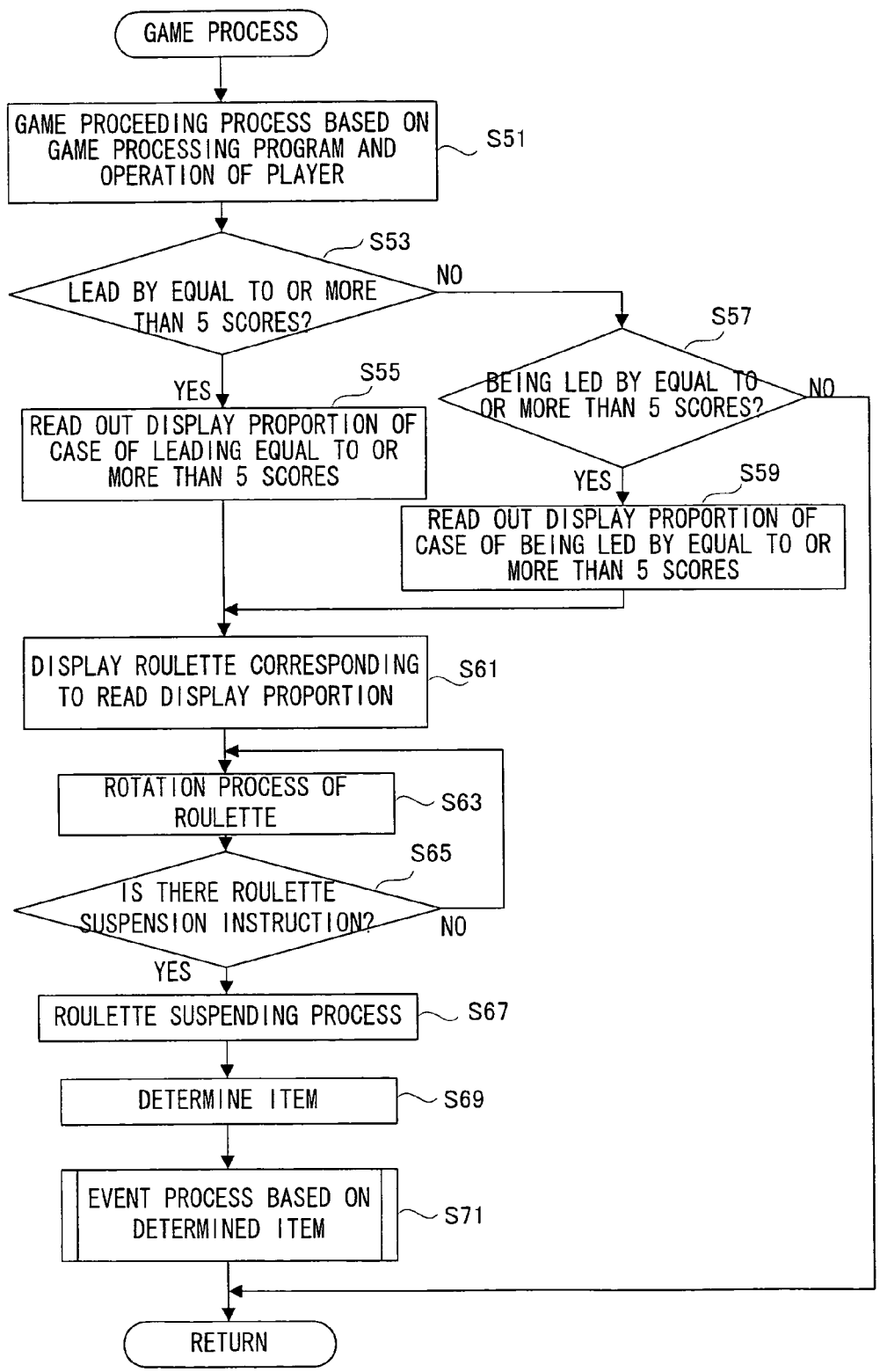
FIG. 10 is a flowchart showing one example of a game process in FIG. 6.

In FIG. 10, shown is a flowchart showing one example of the game process that displays the selection screen according to this game proceeding situation. This process in FIG. 10 corresponds to the detailed example of the game process in the step S29, the step S35, or the step S39 in FIG. 6, for example.

In a first step S51 in FIG. 10, the CPU 42 executes a game proceeding process based on the game process program 72 and an operation of the player. By this process, positions of the player character, the friend character, the opponent character, etc., are calculated, for example, and the game image data is generated based on a calculation result, which allows the game screen to be displayed on the LCD 18.

Subsequently, the proceeding situation of the game is determined. That is, in a step S53, the CPU 42 determines whether or not the player's team or the player character leads against the opponent character by equal to or more than 5 scores. If "YES" in this step S53, the CPU 42 reads out into a predetermined area of the W-RAM 50 the display proportion of the case of leading the game by equal to or more than 5 scores based on the roulette table 84 (FIG. 9) in a succeeding step S55. Upon completion of the step S55, the process advances to a step S61.

On the other hand, if "NO" in the step S53, the CPU 42 determines whether or not the player's team or the player character is led by equal to or more than 5 scores against the opponent character in a step S57. If "YES" in this step S57, the CPU 42 reads out into a predetermined area of the W-RAM 50 the display proportion of the case of being led by equal to or more than 5 scores based on the roulette table 84 in a succeeding step S59. Upon completion of the step S59, the process advances to a step S61.

It is noted that if "NO" in the step S57, that is, in a case that the game proceeding situation is not rendered a predetermined situation, the CPU 42 ends the game process of FIG. 10 without displaying the roulette.

In the step S61, the CPU 42 reads out from the roulette table 84 the image data of the roulette that corresponds to the read display proportion, and allows the roulette to be displayed on the LCD 18.

Subsequently, in a step S63, a rotation process of the roulette is executed, and when it is determined that there is a suspension instruction in a step S65, the suspension process of the roulette is executed in a step S67. Furthermore, one item is determined out of a plurality of selection items of roulette in a step S69. It is noted that the processes from the step S63 to the step S69 are the same as the above-described processes from the step S19 to the step S25 in FIG. 6 so that detailed descriptions will be herein omitted.

Figure 11:
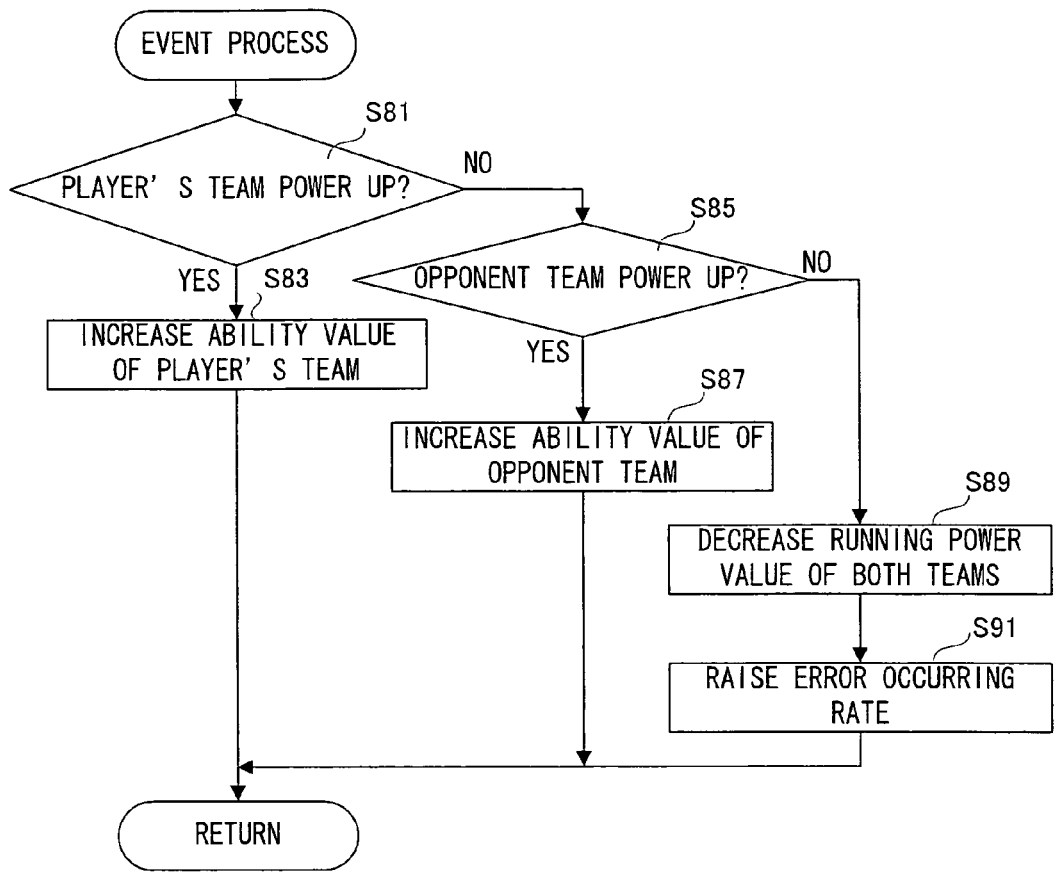
FIG. 11 is a flowchart showing one example of an event process in FIG. 10.

Furthermore, in a step S71, the CPU 42 executes an event process based on the determined item. One example of this event process is described in detail in FIG. 11. As described in FIG. 11, the CPU 42 determines whether or not the determined item is "player's team power up" in a step S81. If "YES" in this step S81, the CPU 42 increases the ability value of the player's team in a succeeding step S83. More specifically, all the ability values of the members of the player's team are increased as a whole, the ability value of a certain member is increased, or only a certain ability value is increased, and so forth. In the baseball game, for example, a speed of the ball of a pitcher, how well a breaking ball is pitched, etc., are increased, or in the soccer game, for example, a shooting power or a running power may be increased.

On the other hand, if "NO" in the step S81, the CPU 42 determines whether or not the determined item is the "opponent team power up" in a step S85. If "YES" in this step S85, the CPU 42 increases the ability value of the opponent team in a succeeding step S87. Herein, too, regarding the ability value of the opponent team, a similar process to the above-described step S83 may be performed.

In addition, if "NO" in the step S85, that is, in a case that the determined item is "rain", the CPU 42 decreases a running-power value of both the player's team and the opponent team in a succeeding step S89. The CPU 42 decreases each of the running-power values of all members of the both teams as a whole, for example. In addition, the CPU 42 increases the error occurring rate so as to make an error or a mistake more likely to occur in a step S91.

According to this embodiment, based on the proceeding situation of the game, the display proportion of the item (event of the game) displayed on the selection screen is set so that it is possible to change the probability of each item to be selected according to a proceeding condition of the game. Furthermore, based on the selected item, the event process in the game is executed so that it is possible to affect the proceeding or the content of the selected game. Thus, it becomes possible to increase the interesting aspect of the game. In addition, it is possible to comprehend the probability of each item to be selected in a visual manner, thus making possible an increase of the interesting aspect when selecting the item.

Furthermore, in the above-described embodiment, the display proportion of each item on the selection screen is set based on the proceeding situation of the game. However, the display proportion of each item may be set based on such an index as to be changed according to the play content of the game, and to be affected by the play content as in another embodiment described next.

That is, in this case of another embodiment, the display proportion of each item is set based on the support voltage changed according to the play content of the game. The support voltage is a voltage that shows a level of excitement or a level of enthusiasm of the virtual audience (audience character) who watches the battle between the player character and the opponent character, and fluctuates between a side that supports the player and a side that supports the competing opponent. In FIG. 12, one example of the support voltage displayed on the game screen is shown. The support voltage in FIG. 12 is shown as a meter 94 in a bar shape that extends to both sides, using 0 (zero) as the center, and its scale meter is shown in such a manner as to have a maximum 100 on the player side on one hand, and a maximum 100 on the competing opponent side on the other hand. Furthermore, a needle portion 96 sways according to a value of the support voltage, and indicates the value of the support voltage at that time.

The support voltage is changed to the player side or the opponent side by a predetermined value as a result of a predetermined change condition being achieved. In FIG. 13, one example of a change condition of the support voltage and the changed value that corresponds thereto is shown. As the change condition of the support voltage, set are various events thought of as to affect the enthusiasm of the audience. In a case that an event that renders the player's team predominant occurs, and other cases such as "player's team hits a home run", "player's team performs a great play", "retire an opponent's offense in three batters", "opponent's team makes a fielding error", etc., only ten is added to the player side. On the other hand, in a case that renders the opponent team predominant occurs, and other cases, such as "opponent team hits a home run", "opponent team performs a great play", "offence of player's team is retired in three batters", "player's team makes a fielding error", etc., only ten is added to the opponent team.

Furthermore, in this embodiment, when the support voltage value is determined in the proceeding of the game, and the support voltage is rendered a predetermined value, the roulette is displayed. In FIG. 9, one example of the roulette 84 applicable in this embodiment is shown. In this FIG. 9, a portion regarding the support voltage in place of a portion regarding the above-described game proceeding situation is indicated by a bracket. On this roulette table 84, the display proportion of each item and the roulette image data are stored in such a manner as to correspond to the support voltage value. As the support voltage value for allowing the roulette to display, two conditions, that is, being a maximum on the opponent side, and being a maximum on the player side, are set. As a plurality of items displayed on the roulette, similar to the above-described embodiment, the events in the game are set, and three items, that is, "player's team power up", "opponent team power up", and "rain", are set, for example. In addition, the display proportion of each item is set to 1:2:1 in a case that the support voltage is the maximum on the opponent side, and is set to 2:1:1 in a case that the support voltage is the maximum on the player side. That is, in this embodiment, the display proportion of each item is set in such a manner that a predominant side becomes even more advantageous.

Figure 14:
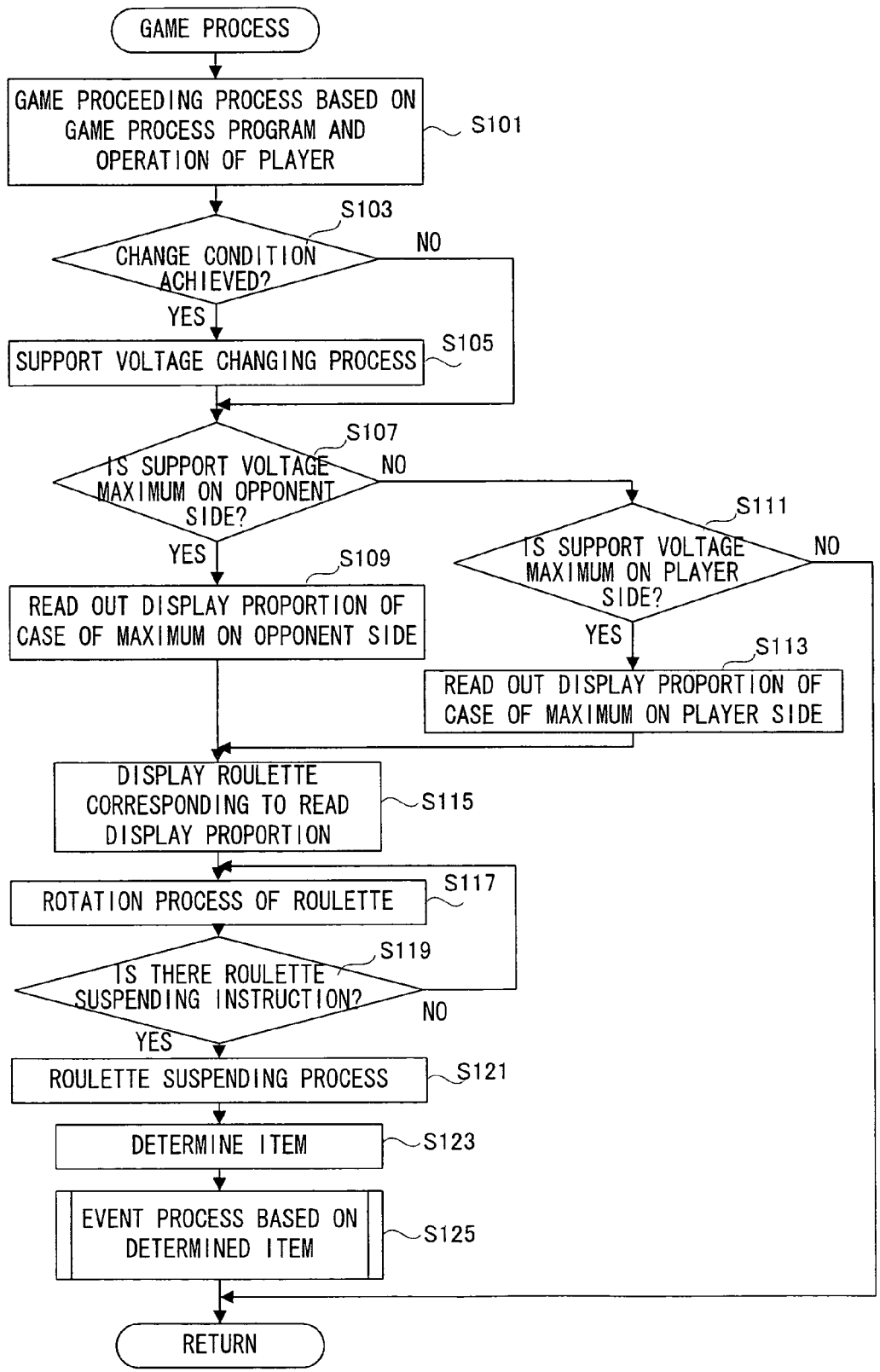
FIG. 14 is a flowchart showing another example of the game process in FIG. 6.

In FIG. 14, shown is a flowchart showing one example of the game process that shows the selection screen according to this support voltage. The process of FIG. 14 is a process that corresponds to the detailed one example of the game process of the step S29, the step S35, or the step S39 in FIG. 6.

In a first step S101 in FIG. 14, the CPU 42 executes the game proceeding process based on the game process program 72 and an operation of the player. The process of this step S101 is similar to the process of the step S51 in FIG. 10, and therefore, the overlapped descriptions will be omitted. Furthermore, in this step S101, in a case that a support voltage change condition (FIG. 13) is achieved, a flag indicative of its achievement is set to be turned on, for example.

Subsequently, the CPU 42 determines whether or not the support voltage change condition is achieved in a step S103. More specifically, the CPU 42 determines whether or not the flag indicative of the change condition being achieved is set to be turned on. If "YES" in this step S103, the CPU 42 executes a support voltage change process in a step S105, and changes the support voltage according to the changed value that corresponds to an achieved condition as shown in FIG. 13. On the other hand, if "NO" in the step S103, the process directly advances to a step S107.

Furthermore, it is determined whether or not the support voltage is rendered a predetermined value. That is, in the step S107, the CPU 42 determines whether or not the support voltage is rendered the maximum on the opponent side. If "YES" in this step S107, the CPU 42 reads out from the roulette table 84 the display proportion of the case that the support voltage is the maximum on the opponent side in a step S109. Upon completion of this step S109, the process advances to a step S115.

On the other hand, if "NO" in the step S107, the CPU 42 determines whether or not the support voltage is rendered the maximum on the player side in a step S111. If "YES" in this step S111, the CPU 42 reads out from the roulette table 84 the display proportion of the case that the support voltage is the maximum on the player side in a succeeding step S113. Upon completion of this step S113, the process advances to a step S115.

It is noted that if "NO" in the step S111, that is, in a case that the support voltage is not raised until the maximum, the CPU 42 ends the game process in FIG. 14 without displaying the roulette.

In the step S115, the CPU 42 reads out from the roulette table 84 the image data of the roulette that corresponds to the read display proportion, and allows the roulette image to be displayed on the LCD 18.

Subsequently, the rotation process of the roulette is executed in a step S117, and when it is determined that there is the suspension instruction in a step S119, the suspension process of the roulette is executed in a step S121. Furthermore, in a step S123, one item is determined out of a plurality of the selected items of the roulette. It is noted that the processes from the step S117 to the step S123 are similar to the processes from the above-described step S19 to the step S25 in FIG. 6, and therefore, the detailed descriptions will be herein omitted.

In addition, in a step S125, the CPU 42 executes the event process based on the determined item. This event process is similar to the step S71, that is, FIG. 11, in the game process flowchart in FIG. 10 described above, and therefore, the detailed descriptions will be herein omitted.

According to this embodiment, based on the support voltage that changes according to the play content of the game, the display proportion of items displayed on the roulette is set so that it is possible to change the probability of each item to be selected depending on the play content. In addition, the event process in the game is executed based on the selected item so that it is possible to affect the proceedings and the content of the selected game. Thus, it is possible to increase the interesting aspect of the game. In addition, it is possible to easily comprehend the probability of each item to be selected in a visual manner so that it is also possible to increase the interesting aspect when selecting the item.

It is noted that in each of the above described embodiments, the roulette is applied for the selection screen. However, the selection screen may be a screen having a display area by each plurality of items for allowing the player to select, and a target of darts, a shooting, etc., may be applicable, for example. In these cases, too, it is possible to obtain the interesting aspect when selecting the item similar to the case of the roulette.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus that executes a game in which a plurality of characters at least including a player character appear, comprising:
    at least one storing location for storing parameter data relating to at least one parameter of the game;
    selection screen displaying programmed logic circuitry for displaying a selection screen which includes a plurality of selectable items usable by the player character, each said item having a display proportion being set relative to each of the other items in the plurality of selectable items based at least in part on said parameter data, wherein the display proportion represents the probability that each said selectable item will be selected;
    an operating controller operated by a player;
    item determining programmed logic circuitry for automatically selecting one item out of said plurality of items displayed on said selection screen by the game apparatus and in accordance with the probability associated with each said selectable item in response to an operation of said operating controller; and
    processing programmed logic circuitry for performing a game process based on said item determined by said item determining programmed logic circuitry.

2. The game apparatus according to claim 1, wherein said item is a kind of competitive sports game correlated at least in part with said parameter data, said parameter data including at least one ability value, or data relating to a rule of the game.

3. A game apparatus according to claim 1, further comprising:
    game proceeding situation determining programmed logic circuitry for determining a proceeding situation of said game, wherein the parameter data includes data relating to the game proceeding situation determined by the game proceeding situation determining programmed logic circuitry, and wherein said selection screen displaying programmed logic circuitry determines the display proportion of each said item based on the data relating to the game proceeding situation determined by said game proceeding situation determining programmed logic circuitry.

4. A game apparatus according to the claim 3, wherein said item is an event of the game.

5. A game apparatus according to claim 1, further comprising:

support level changing programmed logic circuitry for changing a support level of a virtual audience in response to said game being played, wherein the parameter data includes data relating to the support level of the virtual audience in response to said game being played, wherein said selection screen displaying programmed logic circuitry determines the display proportion of each said item based on the data relating to said support level.

6. A game apparatus according to the claim 5, wherein said item is an event of the game.

7. A game apparatus according to claim 1, wherein said selection screen includes a roulette wheel, said item determining programmed logic circuitry includes rotation processing programmed logic circuitry for applying a rotation process to said roulette wheel and suspension processing programmed logic circuitry for applying a suspension process to said roulette wheel being rotated by said rotation processing programmed logic circuitry in response to an operation of said operating controller, and determines one selected item out of said plurality of items displayed on said roulette wheel at a time that said roulette wheel is suspended by said suspension processing programmed logic circuitry.

8. A game apparatus according to claim 1, wherein the at least one storing location stores an ability value of at least one of said characters as the parameter data, and said selection screen displaying programmed logic circuitry determines the display proportion of each said item based on said ability value.

9. The game apparatus according to claim 8, wherein said at least one of the characters includes an opponent character that fights against said player character, the parameter data includes at least one ability value of the opponent character; and said selection screen displaying programmed logic circuitry displays said selection screen to which the display proportion of each item is set based at least in part on said at least one ability value of said opponent character in such a manner as to be rendered advantageous to said opponent character.

10. The game apparatus according to claim 9, wherein said item is a kind of competitive sports game correlated at least in part with said parameter data, said parameter data including at least one ability value, or data relating to a rule of the game.

11. A non-transitory computer readable storage medium that stores a game program for selecting one item out of a plurality of items so as to play a game in a game apparatus provided with an operating controller operated by a player and executing the game program in which a plurality of characters at least including a player character appear, wherein said game apparatus further comprises at least one storing location for storing parameter data relating to at least one parameter of the game, and said game program allows a processor of said game apparatus to execute:

displaying a selection screen which includes a plurality of selectable items usable by the player character, each said item having a display proportion being set relative to each of the other items in the plurality of selectable items based on said parameter data, wherein the display proportion represents the probability that each said selectable item will be selected;

automatically selecting one item out of said plurality of items displayed on said selection screen by the game apparatus and in accordance with the probability associated with each said selectable item in response to an operation of said operating controller; and performing a game process based on said automatically selected item.

12. A non-transitory computer readable storage medium that stores a game program according to claim 11, wherein said game program allows said processor of said game apparatus to further execute:

determining a proceeding situation of said game;

storing data relating to the proceeding situation as said parameter data; and displaying the display proportion of each said item based on data relating to said proceeding situation determination.

13. A non-transitory computer readable storage medium that stores a game program according to claim 11, wherein said game program allows said processor of said game apparatus to further execute:

changing a support level of a virtual audience in response to said game being played;

storing data relating to the support level as the parameter data; and displaying the display proportion of each said item based on the data relating to said support level.

14. A non-transitory storage medium that stores a game program according to claim 11, wherein said selection screen includes a roulette wheel, said item determining includes applying a rotation process to said roulette wheel and suspending said roulette wheel being rotated by said applying a rotation process in response to an operation of said operating controller, and determines one selected item out of said plurality of items displayed on said roulette when said roulette is suspended.

15. A non-transitory storage medium that stores a game program according to claim 11, wherein the at least one storing location stores an ability value of at least one of said characters as the parameter data, and said selection screen displaying programmed logic circuitry determines the display proportion of each said item based on said ability value.

* * * * *